US011018797B2

(12) United States Patent
Golcher Ugalde et al.

(10) Patent No.: US 11,018,797 B2
(45) Date of Patent: May 25, 2021

(54) FIBER OPTIC LIGHT INTENSITY ENCRYPTION

(71) Applicant: INTERNATIONAL BUSINESS MACHINES CORPORATION, Armonk, NY (US)

(72) Inventors: Ricardo A. Golcher Ugalde, San Jose (CR); Franz F. Liebinger Portela, Heredia (CR); Meller J. Perez Nunez, San Jose (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/574,141

(22) Filed: Sep. 18, 2019

(65) Prior Publication Data
US 2020/0014485 A1 Jan. 9, 2020

Related U.S. Application Data

(63) Continuation of application No. 15/955,074, filed on Apr. 17, 2018, now Pat. No. 10,601,538, which is a
(Continued)

(51) Int. Cl.
H04K 1/00 (2006.01)
H04L 9/32 (2006.01)
(Continued)

(52) U.S. Cl.
CPC ........... H04K 1/00 (2013.01); H04B 10/2581 (2013.01); H04B 10/503 (2013.01);
(Continued)

(58) Field of Classification Search
CPC .... H04K 1/00; H04B 10/2581; H04B 10/503; H04B 10/506; H04B 10/541; H04B 10/85; H04L 9/0852; H04L 9/3263
(Continued)

(56) References Cited

U.S. PATENT DOCUMENTS 5,078,059 A 1/1992 Recker
5,715,316 A 2/1998 Steenblik
(Continued)

FOREIGN PATENT DOCUMENTS

CN 202143070 U 2/2012
CN 102156322 B 9/2013
(Continued)

OTHER PUBLICATIONS

Bromberg, Yaron et al.; Secure Optical Communication Using Random Mode Mixing and Time-Reversal Symmetry in Multimode Fibers; CLEO: QELS Fundamental Science 2014, OSA Technical Digest, CLEO: 2014 Postdeadline Japer Digest; Jun. 8-13, 2014; 2 pages.
(Continued)

Primary Examiner — Michael S McNally
(74) Attorney, Agent, or Firm — Schmeiser, Olsen & Watts; Nicholas L. Cadmus

(57) ABSTRACT

A fiber optic light intensity encryption method is provided. The method includes determining light intensities associated with multi-frequency light pulses emitted by a laser transmitter apparatus in response to an encryptions process. An encryption type for application of an encryption algorithm to each light intensity is determined and a first light intensity associated with a first light pulse is selected. Data indicating results of the random selection is transmitted to the laser transmitter apparatus and an initial security key is transmitted over a signaling channel of the laser transmitter apparatus. The signaling channel is secured based on the initial security key resulting in a secure signaling channel. In response, a secure bundle comprising said the secure signaling channel and an additional group of channels is generated and the data is transmitted via the secure bundle.

20 Claims, 7 Drawing Sheets

Related U.S. Application Data continuation of application No. 15/151,764, filed on May 11, 2016, now Pat. No. 9,998,255.

(51) Int. Cl.
  *H04B 10/2581* (2013.01)
  *H04L 9/08* (2006.01)
  *H04B 10/50* (2013.01)
  *H04B 10/54* (2013.01)
  *H04B 10/85* (2013.01)

(52) U.S. Cl.
  CPC ......... *H04B 10/506* (2013.01); *H04B 10/541* (2013.01); *H04B 10/85* (2013.01); *H04L 9/0852* (2013.01); *H04L 9/3263* (2013.01)

(58) Field of Classification Search
  USPC .......................................................... 380/256
  See application file for complete search history.

(56) References Cited

U.S. PATENT DOCUMENTS

| | | | |
|---|---|---|---|
| 6,419,404 | B1 | 7/2002 | Deri |
| 6,768,577 | B2 | 7/2004 | Namiki |
| 7,471,793 | B2 | 12/2008 | Bonfrate |
| 7,945,174 | B2 | 5/2011 | Shpantzer |
| 8,111,777 | B2 | 2/2012 | Agazzi |
| 8,284,937 | B2 | 10/2012 | Akutsu |
| 8,290,323 | B2 | 10/2012 | Donlagic |
| 8,417,069 | B2 | 4/2013 | Chen |
| 8,428,259 | B2 | 4/2013 | Waters |
| 8,582,770 | B2 | 11/2013 | Tomaru |
| 9,998,255 | B2 | 6/2018 | Golcher Ugalde |
| 2002/0025041 | A1* | 2/2002 | Tomita .................. H04L 9/0662 380/256 |
| 2002/0048370 | A1* | 4/2002 | Hirota .................. H04L 9/0858 380/278 |
| 2005/0219114 | A1* | 10/2005 | Kawabe ................ G05D 1/028 342/47 |
| 2007/0147612 | A1 | 6/2007 | Forrest |
| 2008/0273880 | A1 | 11/2008 | Wang |
| 2010/0195174 | A1* | 8/2010 | Nemeth ............... B42D 25/324 359/2 |
| 2010/0195831 | A1* | 8/2010 | Tanaka .................. H04L 9/0858 380/256 |
| 2012/0087500 | A1 | 4/2012 | Ukita |
| 2013/0163752 | A1* | 6/2013 | Baek ................ H04W 12/0401 380/44 |
| 2014/0146969 | A1 | 5/2014 | Sadot |
| 2017/0331583 | A1 | 11/2017 | Golcher Ugalde |
| 2018/0234201 | A1 | 8/2018 | Golcher Ugalde |

FOREIGN PATENT DOCUMENTS

| | | |
|---|---|---|
| CN | 102932142 B | 10/2015 |
| JP | 2006229194 A | 8/2006 |
| JP | 2010044129 a | 3/2012 |
| JP | 2014506433 B2 | 3/2014 |
| WO | 2003043246 A1 | 5/2003 |
| WO | 2009003228 A1 | 1/2009 |
| WO | 2012175697 A1 | 12/2012 |
| WO | 2014057299 A1 | 4/2014 |
| WO | 2014105579 A1 | 7/2014 |
| WO | 2015048783 A1 | 4/2015 |

OTHER PUBLICATIONS

Friedman, Mark J.; List of IBM Patents or Patent Applications Treated as Related, 1 page, Sep. 2019.

Kravtsov, Konstantin et al; Physical layer secret key generation for fiber-optical networks; Optics Express, vol. 21, No. 20; Oct. 7, 2013; pp. 23756-23771.

Maksymiuk, L., et al.; Multimode fiber bandwidth increase by means of spatial light filtration; 2010 19th Annual Wireless and Optical Communications Conference (WOCC); May 14-15, 2010; pp. 1-4.

Thomsen, Benn et al.; Exploiting the bandwidth potential of multimode optical fibres; Retrieved from the Internet, URL: http://www.ee.ucl.ac.uk/ong/group-research/comimo; retrieved on Feb. 26, 2015; 2 pages.

* cited by examiner

FIBER OPTIC LIGHT INTENSITY ENCRYPTION

CROSS REFERENCE TO RELATED APPLICATIONS

This application is a continuation application claiming priority to Ser. No. 15/955,074 filed Apr. 17, 2018, now U.S. Pat. No. 10,601,538 issued Mar. 24, 2020, which is a continuation application claiming priority to Ser. No. 15/151,764 filed May 11, 2016 now U.S. Pat. No. 9,998,255 issued Jun. 12, 2018, the contents of which are hereby incorporated by reference.

FIELD

The present invention relates generally to a method for using multimode fiber optic capability to transport secure data and in particular to a method and associated system for transporting secure data via differing light intensities associated with multi-frequency light pulses.

BACKGROUND

A data transmission system typically requires data security during transmission. Data security processes are typically not applicable to multiple differing scenarios. Accordingly, there exists a need in the art to overcome at least some of the deficiencies and limitations described herein above.

SUMMARY

A first aspect of the invention provides a fiber optic light intensity encryption method comprising: determining, by a computer co-processor of a laser transmitter apparatus, a plurality of light intensities associated with a plurality of multi-frequency light pulses emitted by a laser transmitter apparatus, wherein the plurality of light intensities associated with the plurality of multi-frequency light pulses are associated with an encryptions process; determining, by the computer co-processor in combination with the laser transmitter apparatus, an encryption type for applying to each light intensity of the plurality of light intensities; randomly selecting, by the computer co-processor, a first light intensity of the plurality of light intensities associated with a first light pulse of the plurality of multi-frequency light pulses; transmitting, by the co-processor to the laser transmitter apparatus, data indicating results of the randomly selecting; transmitting to the laser receiver apparatus, by the computer co-processor, an initial security key over a first signaling channel of a plurality of channels of the laser transmitter apparatus, wherein the first signaling channel is associated with the first light intensity of the first light pulse; securing, by the computer co-processor based on the initial security key, the first signaling channel resulting in a first secure signaling channel; generating, by the computer co-processor based on the first secure signaling channel, a secure bundle comprising the first secure signaling channel and a group of channels of the plurality of channels and associated transmission frequencies; and transmitting, by the computer co-processor, data via the secure bundle.

A second aspect of the invention provides a laser transmitter apparatus comprising a computer co-processor coupled to a computer-readable memory unit, the memory unit comprising instructions that when executed by the computer co-processor implements a fiber optic light intensity encryption method comprising: determining, by the computer co-processor, a plurality of light intensities associated with a plurality of multi-frequency light pulses emitted by a laser transmitter apparatus, wherein the plurality of light intensities associated with the plurality of multi-frequency light pulses are associated with an encryptions process; determining, by the computer co-processor in combination with the laser transmitter apparatus, an encryption type for applying to each light intensity of the plurality of light intensities; randomly selecting, by the computer co-processor, a first light intensity of the plurality of light intensities associated with a first light pulse of the plurality of multi-frequency light pulses; transmitting, by the computer co-processor to the laser transmitter apparatus, data indicating results of the randomly selecting; transmitting to the laser receiver apparatus, by the computer co-processor, an initial security key over a first signaling channel of a plurality of channels of the laser transmitter apparatus, wherein the first signaling channel is associated with the first light intensity of the first light pulse; securing, by the computer co-processor based on the initial security key, the first signaling channel resulting in a first secure signaling channel; generating, by the computer co-processor based on the first secure signaling channel, a secure bundle comprising the first secure signaling channel and a group of channels of the plurality of channels and associated transmission frequencies; and transmitting, by the computer co-processor, data via the secure bundle.

A third aspect of the invention provides a computer program product, comprising a computer readable hardware storage device storing a computer readable program code, the computer readable program code comprising an algorithm that when executed by a computer co-processor of a laser transmitter apparatus implements a fiber optic light intensity encryption method, the method comprising: determining, by the computer co-processor, a plurality of light intensities associated with a plurality of multi-frequency light pulses emitted by a laser transmitter apparatus, wherein the plurality of light intensities associated with the plurality of multi-frequency light pulses are associated with an encryptions process; determining, by the computer co-processor in combination with the laser transmitter apparatus, an encryption type for applying to each light intensity of the plurality of light intensities; randomly selecting, by the computer co-processor, a first light intensity of the plurality of light intensities associated with a first light pulse of the plurality of multi-frequency light pulses; transmitting, by the computer co-processor to the laser transmitter apparatus, data indicating results of the randomly selecting; transmitting to the laser receiver apparatus, by the computer co-processor, an initial security key over a first signaling channel of a plurality of channels of the laser transmitter apparatus, wherein the first signaling channel is associated with the first light intensity of the first light pulse; securing, by the computer co-processor based on the initial security key, the first signaling channel resulting in a first secure signaling channel; generating, by the computer co-processor based on the first secure signaling channel, a secure bundle comprising the first secure signaling channel and a group of channels of the plurality of channels and associated transmission frequencies; and transmitting, by the computer co-processor, data via the secure bundle.

The present invention advantageously provides a simple method and associated system capable of providing data security during transmission.

DETAILED DESCRIPTION

Figure 1:
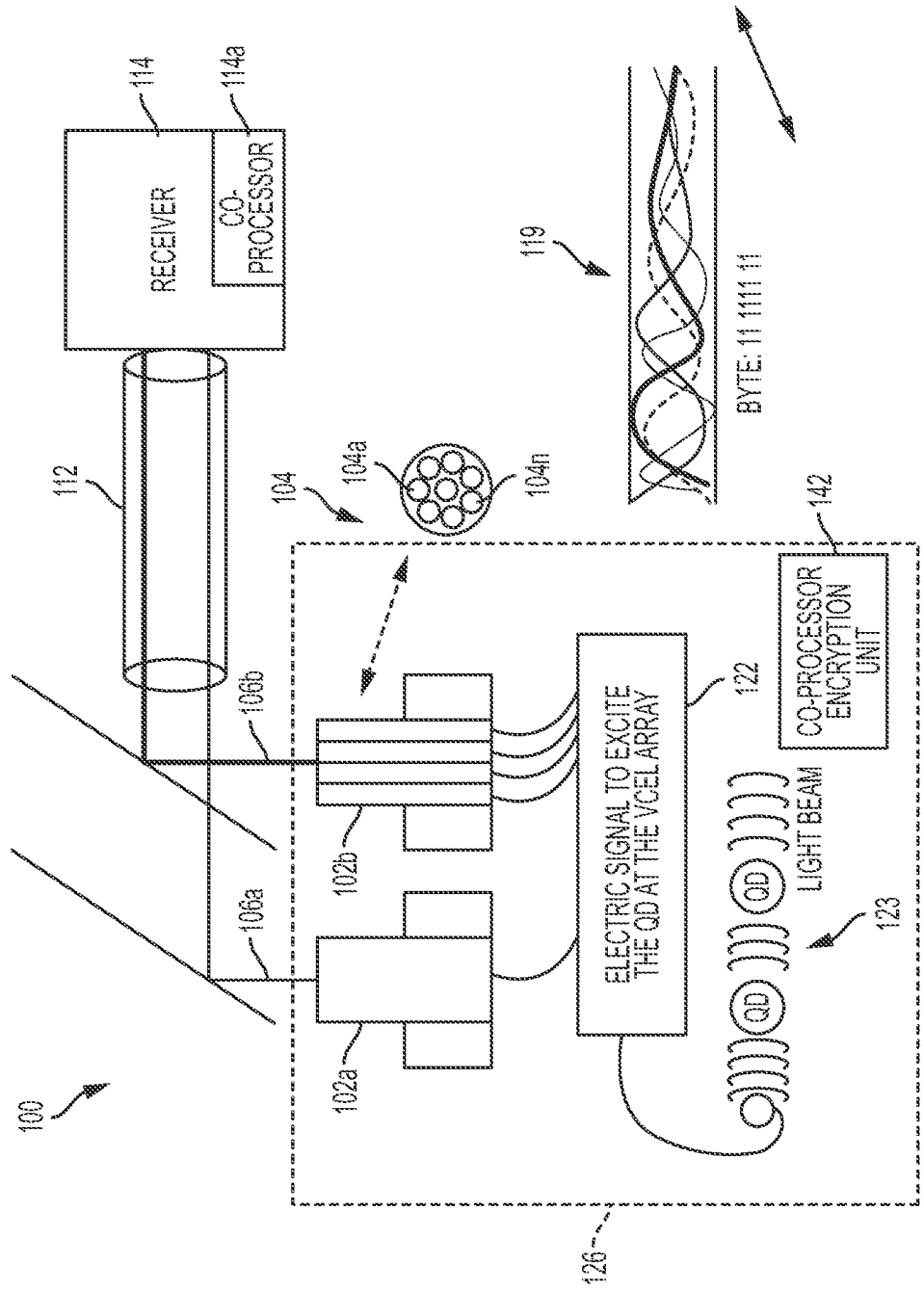
FIG. 1 illustrates a system for transmitting multiple frequency light pulses for enabling a maximum available bandwidth for use in communications systems and for transmitting multiple frequency light pulses for transporting secure transmissions via multiple frequencies and/or light intensities over multimode fiber optic cables, in accordance with embodiments of the present invention.

FIG. 1 illustrates a system 100 detailing a communication process enabled by system 100 of FIG. 1 for transmitting multiple frequency light pulses for enabling a maximum available bandwidth for use in communications systems and for transmitting multiple frequency light pulses for transporting secure transmissions via multiple frequencies and/or light intensities over multimode fiber optic cables, in accordance with embodiments of the present invention. System 100 comprises (QD Vcel) laser cannons 102a and 102b (of a transmitter apparatus 126) transmitting the light signals to a receiver apparatus 114. Laser cannon 102a comprises an out of band (OOB) single laser device. Laser cannon 102b comprises a multiple laser cannon device. Front view 104 of laser canon 102b illustrates multiple laser crystals 104a . . . 104n for data transmission. System 100 combines a set of frequencies 106a and 106b (generated by laser canons 102a and 102b) together into a single (multimode) fiber cable 112. The combined set of frequencies represents patterns of bits 119 with respect to each light pulse. System 100 enables a process including channel hopping and encryption within a single fiber strand to secure data in transit and avoid data theft or injection.

Transmitter apparatus 126 and receiver apparatus 114 may each comprise a specialized hardware device comprising specialized (non-generic) hardware and circuitry (i.e., specialized discrete non-generic analog, digital, and logic based circuitry) for executing a process described with respect to FIGS. 1-5. The specialized discrete non-generic analog, digital, and logic based circuitry may include proprietary specially designed components (e.g., a specialized integrated circuit designed for only implementing an automated process for transmitting multiple frequency light pulses for transporting secure transmissions using multiple frequencies over multimode fiber optic cables.

System 100 enables the use of a multimode fiber capacity by using differing crystal sizes (i.e., for laser devices 104a . . . 104n) for laser cannon 102b to enable input of differing wave lengths into fiber cable 112. A communications process is initiated when a transmitter 122 enables an attenuation test by firing a laser beam with respect to each of laser crystals 104a . . . 104n such that receiver device 114 expects a receiver acknowledge signal for each of laser crystals 104a . . . 104n. The attenuation test is continuously run until any unsuccessful transmitter crystals (of laser crystals 104a . . . 104n) are disabled. In response, a maximum number of concurrent signals for transmission as well as a numeric base upon which data communication will occur are set. Additionally, a calibration phase is enabled. The calibration phase comprises transmitting a sequence of binary frames starting from a highest number of active crystals down to one active crystal and registering a definition for each color frame.

System 100 comprises a sender apparatus 126 and (laser) receiver apparatus 114. Sender apparatus comprises a controller co-processor 142, a light beam 123, transmitter 122, and laser canons 102a and 102b. Receiver apparatus 114 comprises a controller co-processor 114a. Receiver apparatus 114 is enabled to receive any light wave band color and determine (via co-processor 114a) light wave color combinations that produced a resulting wave. In response, co-processor 114a caches a resulting bit pattern until the bit pattern fills a complete frame. The completed bit pattern is passed through processing with respect to higher level protocols. The co-processor verifies a bit pattern checksum against received out of band information, to ensure data was received properly or requires re-transmission. If sender apparatus 126 comprises a legacy sender unit, system 100 will detect a light pattern and disable co-processor 114a functionality to conserve power. Sender apparatus 126 comprises a multiple QD Vcel array for emitting multiple channels or "colors" simultaneously as well as an out of band (IR or UV) laser emitting signaling and checksum bits.

System 100 enables a process as follows:

Upon receiving an out of band signal, system 100 initiates a (bandwidth throttling) calibration process. If receiver apparatus 114 receives light pulses and no out of band signal is detected, system 100 enables a legacy mode, and disables throttling functionality. The calibration process comprises enabling and disabling each of the Vcel lasers and determining a received color. Additionally, a series of all enabled/ some enabled or all off Vcel laser pulses are processed to ensure that an aggregation of colors is being detected reliably. The calibration process includes:

1. Receiving (by receiver apparatus 114 from QD Vcel cannon 106a) a group of multi-frequency light pulses via a plurality of channels.
2. A co-processor determines that the group of multi-frequency light pulses comprises an out of band (OOB) signal transmitted over a first channel of the plurality of channels.
3. Receiver apparatus 114 received (from a first laser device of QD Vcel cannon) a first light pulse of the plurality of multi-frequency light pulses. The first light pulse includes a first frequency for testing a visibility of the first light pulse at receiver apparatus 114.
4. The co-processor determines (in response to receiving the first light pulse) if the first light pulse is visible at receiver apparatus 114. If the first light pulse is visible at receiver apparatus 114 then all laser devices are independently tested and differing groups of the lasers are tested within a specified threshold until the calibration process has completed. If the first light pulse is not visible at receiver apparatus 114 then the laser device is disabled and additional laser devices are tested until the calibration process has completed.

Upon completion of the calibration process, co-processor 114a determines a base at which the data transmission will be throttled, (1x-"n"x) and a (bandwidth throttling) communication process is initiated. If an error detection of more than an acceptable amount of packets is determined then, the calibration process will re-start to eliminate unreliable channels. The communication process includes:

1. Assigning (by the computer co-processor) bit locations for a plurality of multi-frequency light pulses transmitted over a plurality of channels enabled by the lasers of the QD Vcel cannon. The assignment is based on a laser pattern table (generated during the calibration process) describing laser generated light pulses.
2. The co-processor appends a parity bit associated with the OOB signal transmitted over a first channel of the plurality of channels.
3. An odd or even number of frequencies of the plurality of multi-frequency light pulses are compared with the parity bit.
4. It is determined (based on results of the comparison) if a pattern associated with the plurality of multi-frequency light pulses comprises a correct pattern. If the pattern is correct then bit locations for an additional plurality of multi-frequency light pulses transmitted over an additional plurality of channels enabled by the lasers of the QD Vcel cannon are assigned based on the laser pattern table. If the pattern is not correct then plurality of multi-frequency light pulses are re-transmitted over the plurality of channels to determine a correct pattern.

Upon completing the communication process, system 100 may execute a process for secure transmission using multiple frequencies over a multimode fiber cable. The process includes validating that system 100 supports the aforementioned bandwidth throttling process. In response to the validation, a secure physical channel is generated via an OOB channel enablement as described, supra. An associated security key is validated or exchange via a selected predetermined secure algorithm to secure the OOB secure channel enablement. The associated security key may be validated or exchanged via usage of hardware pre-share keys for securing OOB secure channel enablement. Alternatively, the associated security key may be validated or exchanged via usage of hardware certificates for securing OOB secure channel enablement. Additionally, the associated security key may be validated or exchanged via usage of generated random self-signed hardware certificates for securing OOB secure channel enablement. A communication channel bundle selection is secured in response to a user input requesting a specified number of required secure channels. The specified number of required secure channels of the bundle may include: all available channels or a subset of available channels. System 100 may select frequencies for the channel bundle selection. System 100 may include an N number of channels or frequencies available for data transition such that when a channel is not in use, system 100 may dynamically include the unused channel with the communication channel bundle selection and remove an unused frequency at each random channel selection instance. Additionally, a random channel may be selected from a communication channel bundle selection and associated random bundle bit count. A random key may be generated for securing each channel included within a secure communication channel bundle. An additional rekeying policy may be enabled. The rekeying policy may be configurable for users of system 100 to enable user defined policies thereby enabling channel encryption and generating a communication tunnel. The communication tunnel is enabled to transfer data such that when a channel is not used for data transfer, the unused channel may be used for overflow or migrating OOB secure channel data for the secure communication channel bundle. Additionally, a random channel selection and associated random bundle bit count may be triggered at a predetermined threshold prior to expiration of a bit count for the secure communication channel bundle. In response to the expiration of the bit count, system 100 enables a channel hopping process with respect to a new randomly assigned channel within the secure communication channel bundle. Data is transferred using a resulting communication tunnel until the transfer is complete. If an error on a channel in the secure communication channel bundle is detected, the channel is disabled, an alarm is issued, and existing predetermined routing and switching methods are enabled to secure an alternative fiber path.

Alternatively (upon completing the communication process), system 100 may execute a process for secure transmission using differing light intensities (enabled by laser crystals 104a . . . 104n of laser cannon 102b) over a multimode fiber cable. The process includes validating that system 100 supports the aforementioned bandwidth throttling process. In response to the validation, light intensities (enabled by laser crystals 104a . . . 104n of laser cannon 102b) available with respect to an encryption process are determined. For example, sender apparatus 126 and (laser) receiver apparatus 114 may determine (in combination) an specified encryption algorithm for application with respect to each light intensity (of multi-frequency light pulses enabled by sender apparatus 126) such that when switching (i.e., hopping) to a new light intensity sender apparatus 126 and receiver apparatus 114 are able to determine how the data is encrypted. In response, a random selection for a usable light intensity is executed and transmitted to sender apparatus 126. A hardware or software pre-shared security key may be included for securing the light intensity selection. Alternatively, an associated hardware or software certificates may be included for securing the light intensity selection. Additionally, a random self-signed hardware or software certificate may be included for securing the light intensity selection. The hardware or software pre-shared security key is validated or exchanged via any type of secure algorithm such as, inter alia, a Diffie Hellman algorithm via a selected light intensity channel thereby enabling an option for creating a secure physical channel through the use of a differing light intensities. A communication channel bundle selection is secured in response to a user input requesting a specified number of required secure channels. The specified number of required secure channels of the bundle may include: all available channels or a subset of available channels. System 100 may select frequencies for the channel bundle selection. System 100 may include an N number of channels or frequencies available for data transition such that when a channel is not in use, system 100 may dynamically include the unused channel with the communication channel bundle selection and remove an unused frequency at each random channel selection instance. System 100 may select frequencies and associated light intensities for the channel bundle selection. Additionally, a random light intensity and associated random bundle bit count may be selected. A random key generation process may be enabled to secure each channel included in the secure communication channel bundle with respect to an associated light intensity and a channel encryption process may be enabled resulting in a data transfer process. Additionally, a random channel selection and associated random bundle bit count may be triggered at a predetermined threshold prior to expiration of a bit count for the secure communication channel bundle. In response to the expiration of the bit count, system 100 enables a light intensity hopping process with respect to a new randomly assigned light intensity within the secure communication channel bundle. Data is transferred using a resulting communication tunnel until the transfer is complete.

Figure 2:
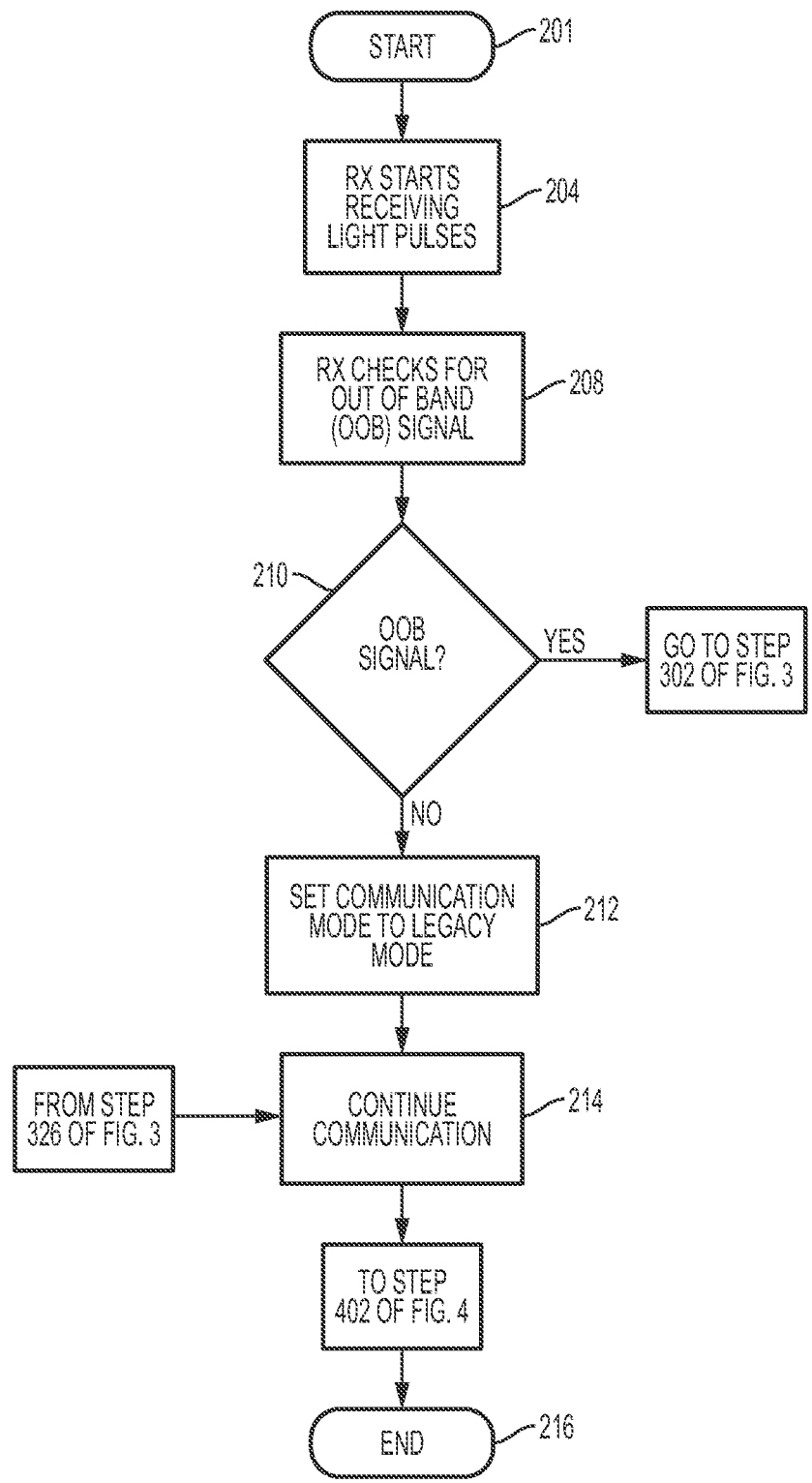
FIG. 2 illustrates a flowchart detailing an overall process enabled by the system of FIG. 1 for transmitting multiple frequency light pulses for enabling a maximum available bandwidth for use in communications systems, in accordance with embodiments of the present invention.
Figure 3:
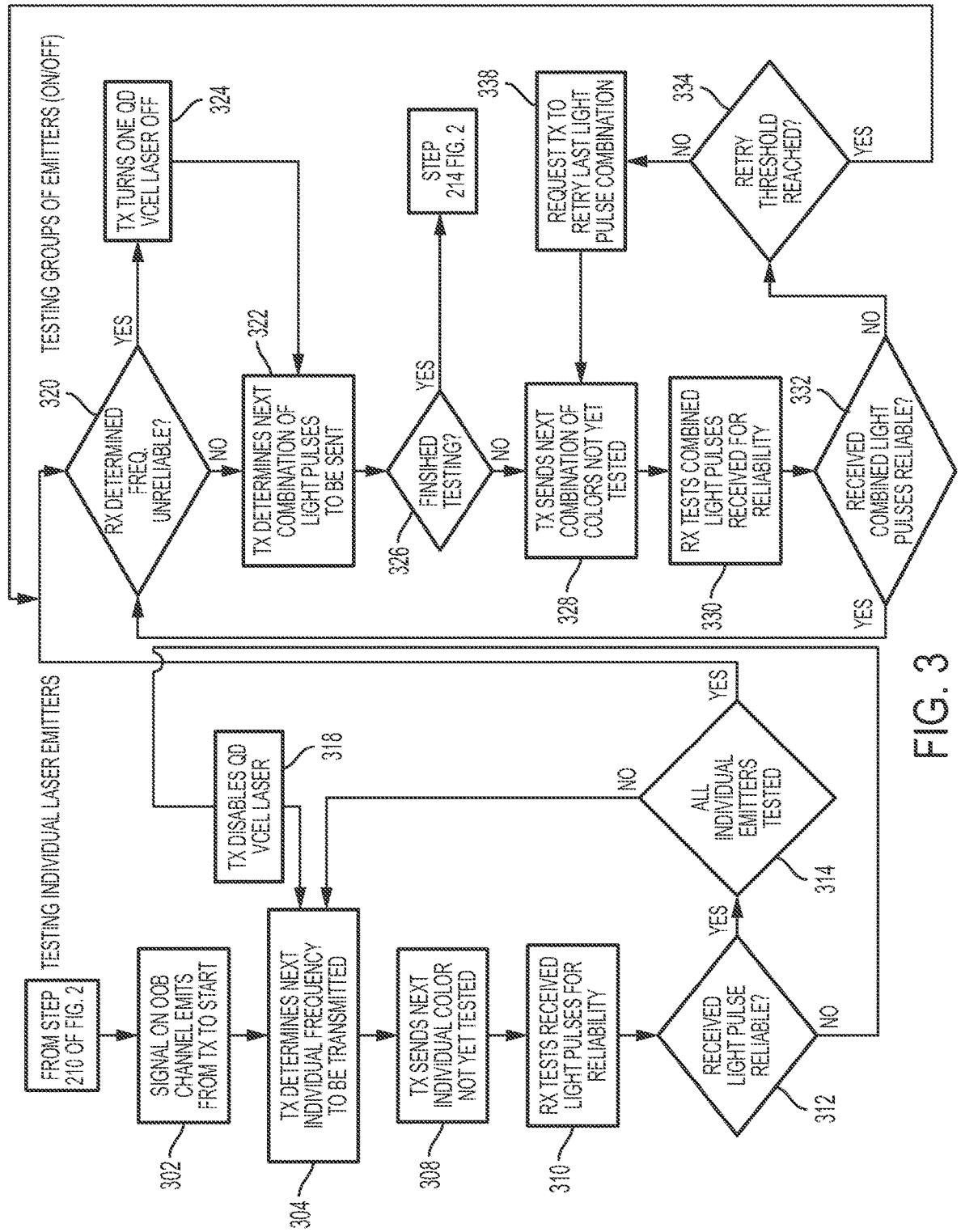
FIG. 3 illustrates a flowchart detailing a calibration process enabled by the system of FIG. 1, in accordance with embodiments of the present invention.

FIG. 2 illustrates a flowchart detailing an overall process enabled by system 100 of FIG. 1 for transmitting multiple frequency light pulses for enabling a maximum available bandwidth for use in communications systems, in accordance with embodiments of the present invention. Each of the steps in the algorithm of FIG. 2 may be enabled and executed in any order by a computer processor executing specialized computer code. In step 201, the process is initiated. In step 204, a receiver apparatus (e.g., receiver apparatus 114 of FIG. 1) receives (from a QD Vcel cannon of a transmitter apparatus) a plurality of multi-frequency light pulses via a plurality of channels. In step 208, a (computer) co-processor of the receiver apparatus checks for an OOB signal. If in step 210, the co-processor determines that the plurality of multi-frequency light pulses comprises an OOB, then step 302 of FIG. 3 is executed as described with respect to FIG. 3, infra. If in step 210, the co-processor determines that the plurality of multi-frequency light pulses does not comprise an OOB, then in step 212, a legacy communication mode is enabled. In step 214, communications are transmitted and step 402 of FIG. 3 is executed as described with respect to FIG. 4, infra. The process is terminated in step 216.

FIG. 3 illustrates a flowchart detailing a calibration process enabled by system 100 of FIG. 1 for transmitting multiple frequency light pulses for enabling a maximum available bandwidth for use in communications systems, in accordance with embodiments of the present invention. Each of the steps in the algorithm of FIG. 3 may be enabled and executed in any order by a computer processor executing specialized computer code. In step 302, a signal is transmitted from a transmitter device over an OOB channel. In step 304, the transmitter device determines a next individual frequency light pulse (e.g., light pulse or color) to be transmitted. In step 308, next individual frequency light pulse (i.e., that has not been tested) is transmitted to a receiver apparatus. In step 310, the receiver apparatus tests the received individual frequency light pulse for reliability. In step 312, it is determined if the received individual frequency light pulse is reliable (i.e., visible). If in step 312, it is determined that the received individual frequency light pulse is not reliable then in step 318 the transmitter apparatus disables the associated QD Vcel laser transmitting the received individual frequency light pulse and step 304 is repeated to determine another individual frequency light pulse for transmission. If in step 312, it is determined that the received individual frequency light pulse is reliable then in step 314, it is determined if all individual laser emitters have been tested. If in step 314, it is determined that all individual laser emitters have not been tested then step 304 is repeated. If in step 314, it is determined that all individual laser emitters have been tested then in step 320, it is determined if the received individual frequency light pulse is unreliable. If in step 320, it is determined that the received individual frequency light pulse is unreliable then in step 324, the transmitter apparatus disables an associated Vcel laser and step 322 in executed as described, infra. If in step 320, it is determined that the received individual frequency light pulse is not unreliable then in step 322, the transmitter apparatus determines a group of multiple frequency light pulses for transmission. In step 326, it is determined if the testing process has completed. If the testing process has completed then step 214 of FIG. 2 is executed as described, supra. If the testing process has not completed then in step 328, the transmitter apparatus transmits a next group of multiple frequency light pulses (that have not been tested) for transmission. In step 330, the receiver tests the next group of multiple frequency light pulses for reliability and in step 332 it is determined if the received (i.e., from step 328) group of multiple frequency light pulses is reliable. If the received group of multiple frequency light pulses is reliable then step 320 is repeated. If the received group of multiple frequency light pulses are not reliable then in step 334 it is determined if a testing retry threshold has been reached. If the retry threshold has been reached then step 320 is repeated. If the retry threshold has not been reached then in step 338, a request for the transmitter apparatus to retry a last frequency light pulse combination is enabled and step 328 is repeated.

Figure 4:
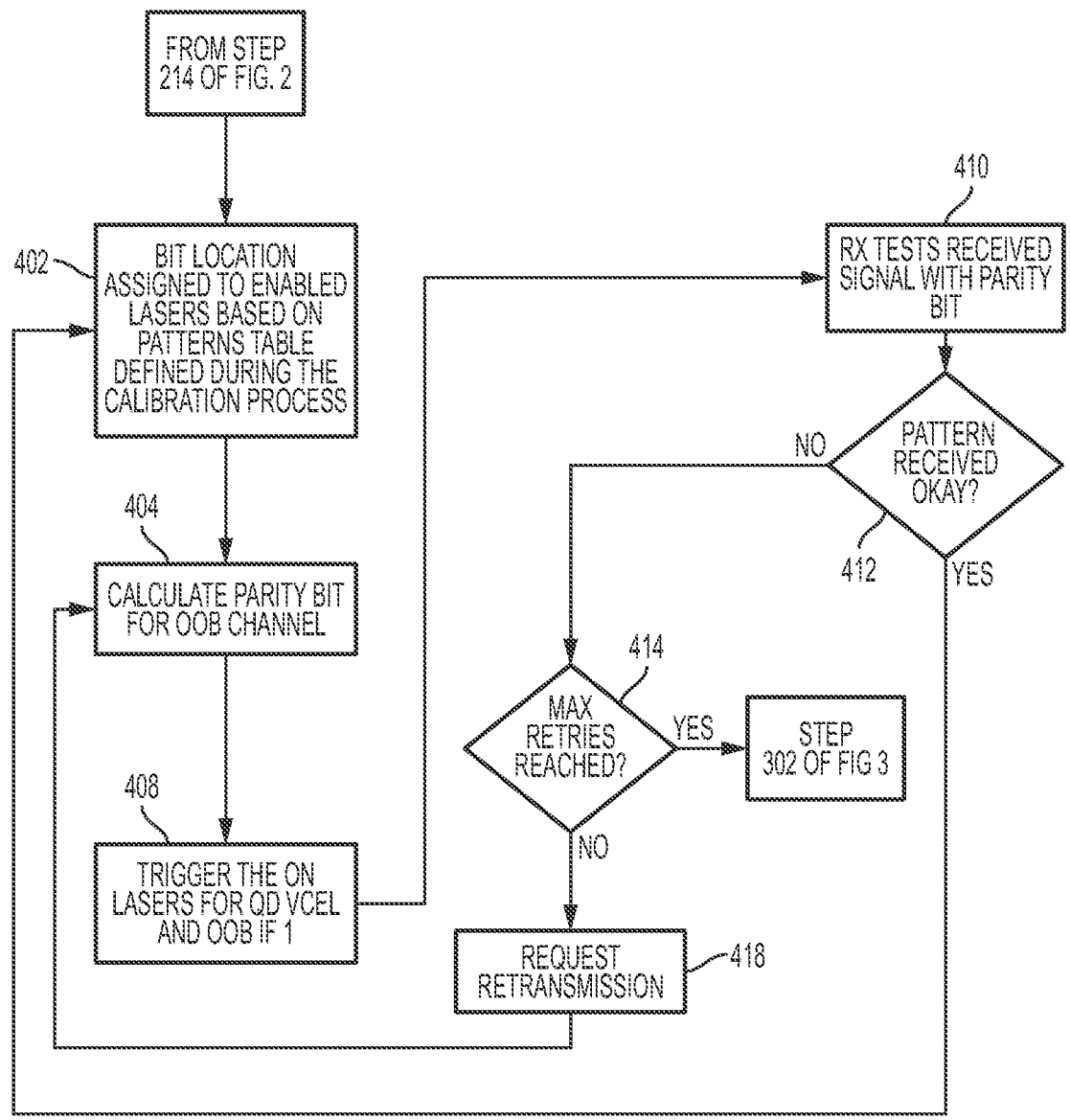
FIG. 4 illustrates a flowchart detailing a communication process enabled by the system of FIG. 1, in accordance with embodiments of the present invention.

FIG. 4 illustrates a flowchart detailing a communication process enabled by system 100 of FIG. 1 for transmitting multiple frequency light pulses for enabling a maximum available bandwidth for use in communications systems, in accordance with embodiments of the present invention. Each of the steps in the algorithm of FIG. 4 may be enabled and executed in any order by a computer processor executing specialized computer code. In step 402, a bit location is assigned to enabled lasers (e.g., of laser devices 104a . . . 104n of laser cannon 102b of FIG. 1) based on a laser pattern table describing laser generated light pulses defined during the calibration process described with respect to FIG. 3. In step 404, a parity bit is calculated for an OOB channel. In step 408, enabled lasers for a QD Vcel laser and associated OOB are triggered for a logical high bit. In step 410, the receiver apparatus tests a received signal with respect to the parity bit. In step, 412, it is determined if the bit pattern is reliably received. If the bit pattern is reliably received then step 402 is repeated. If the bit pattern is not reliably received then in step 414, it is determined if a maximum number of bit pattern receiving tries has been reached. If it is determined that a maximum number of bit pattern receiving tries has been reached then step 302 is repeated. If it is determined that a maximum number of bit pattern receiving tries has been reached then in step 418, a retransmission for the bit pattern is requested and step 404 is repeated.

Figure 5:
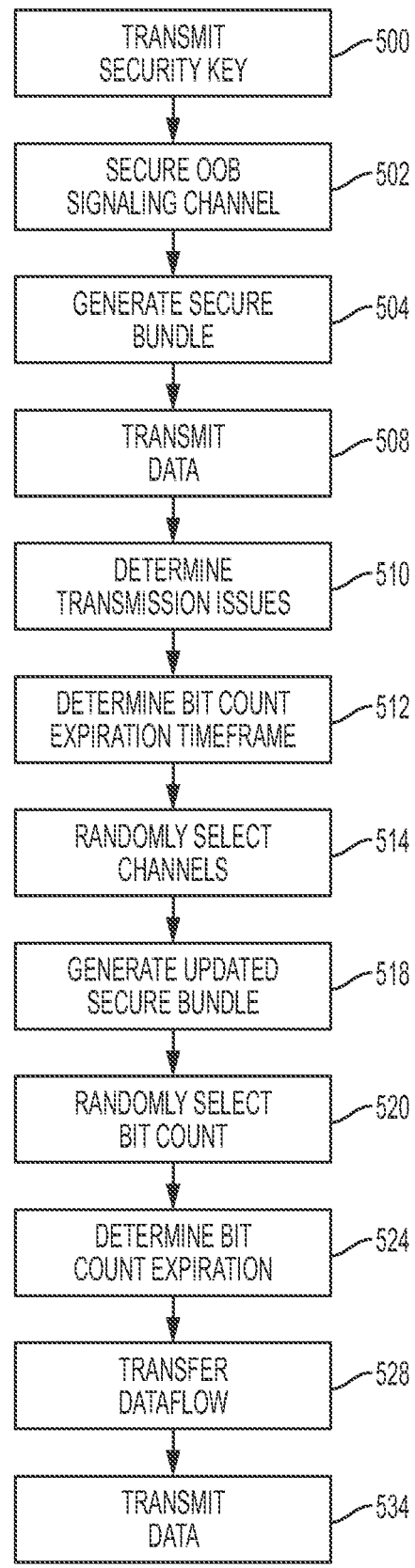
FIG. 5 illustrates a flowchart detailing a process for transmitting multiple frequency light pulses for transporting secure transmissions using multiple frequencies over multimode fiber optic cables in accordance with embodiments of the present invention.

FIG. 5 illustrates a flowchart detailing a process for transmitting multiple frequency light pulses for transporting secure transmissions using multiple frequencies over multimode fiber optic cables in accordance with embodiments of the present invention. Each of the steps in the algorithm of FIG. 5 may be enabled and executed in any order by a computer processor executing specialized computer code. In step 500, an initial security key is transmitted (by laser transmitter apparatus 126 of FIG. 1) to a laser receiver apparatus (laser receiver apparatus 114 of FIG. 1) over an out of band (OOB) signaling channel of a plurality of channels of the laser transmitter apparatus. In step 502, the OOB signaling channel is secured (based on the initial security key) resulting in a secure OOB signaling channel. In step 504, a secure bundle comprising the secure OOB signaling channel and a group of channels of the plurality of channels and associated transmission frequencies is generated based on the secure OOB signaling channel. The secure bundle may be generated by the following process:

1. Randomly selecting the group of channels.
2. Randomly selecting a bit count associated with the secure bundle.
3. Randomly generating a secure key for securing each channel of the group of channels.
4. Encrypting (by the secure key) the group of channels.

In step 508, data is transmitted via the secure bundle. In step 510, it is determined if any channels of the group of channels does not transmit the data. If in step 510, it is determined that at least one channel does not transmit the data then the at least one channel is allocated for migrating dataflow over the secure OOB signaling channel to the at least one channel. In step 512, it is determined that the bit count (for the secure bundle) will expire within a specified time period. In step 514, a new group of channels is randomly selected. In step 518, an updated secure bundle comprising the secure OOB signaling channel and an updated group of channels and updated associated transmission frequencies is generated. In step 520, an updated bit count associated with the updated secure bundle is randomly selected. In step 524, it is determined that the updated bit count has expired. In step 528, flow of the data being transmitted is transferred via the secure bundle to the updated secure bundle. In step 534, the data is transmitted via the updated secure bundle.

Figure 6:
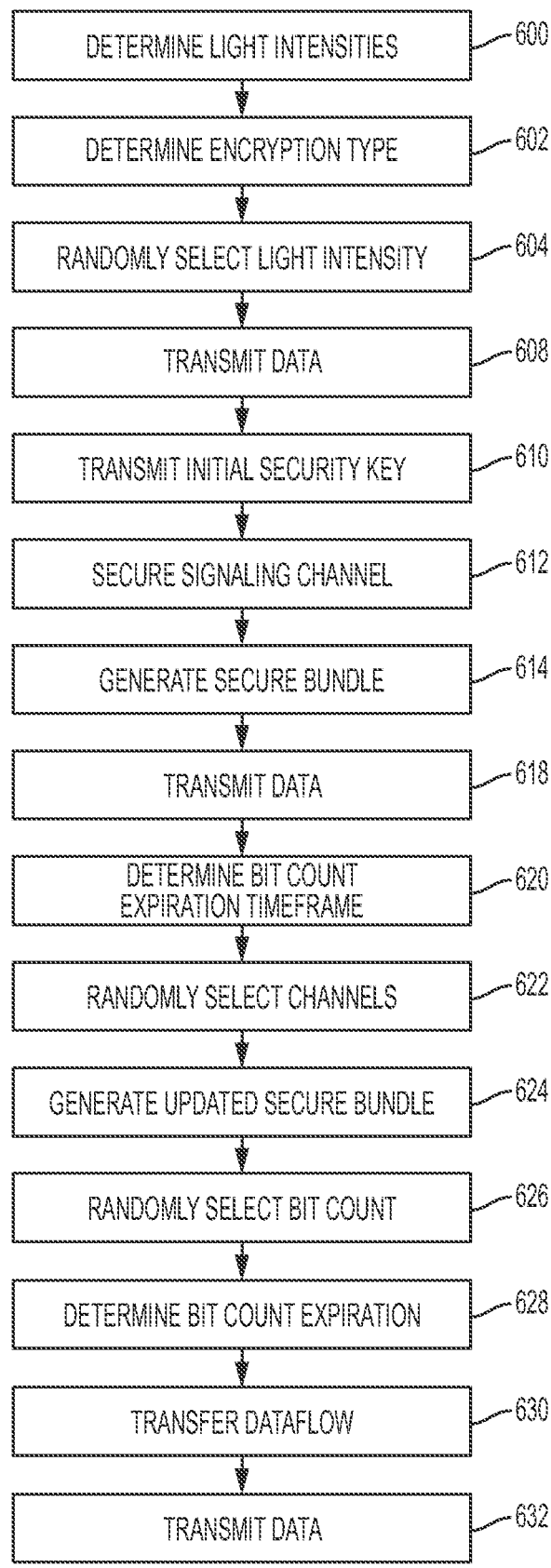
FIG. 6 illustrates a flowchart detailing a process for transmitting multiple frequency light pulses for transporting secure (encrypted) transmissions via multiple light intensities over multimode fiber optic cables, in accordance with embodiments of the present invention.

FIG. 6 illustrates a flowchart detailing a process for transmitting multiple frequency light pulses for transporting secure (encrypted) transmissions via multiple light intensities over multimode fiber optic cables, in accordance with embodiments of the present invention. Each of the steps in the algorithm of FIG. 6 may be enabled and executed in any order by a computer processor executing specialized computer code. In step 600, a plurality of light intensities associated with a plurality of multi-frequency light pulses emitted by a laser transmitter apparatus are determined. The plurality of light intensities associated with the plurality of multi-frequency light pulses are associated with an encryptions process. In step 602, an encryption type for applying to each light intensity is determined. In step 604, a first light intensity (of the plurality of light intensities) is randomly selected. In step 608, data indicating results of the random selection is transmitted to the laser transmitter apparatus. In step 610, an initial security key is transmitted to the laser receiver apparatus over a first signaling channel of a plurality of channels of the laser transmitter apparatus. The first signaling channel is associated with the first light intensity of the first light pulse. In step 312, the first signaling channel is secured (based on the initial security key) resulting in a secure signaling channel. In step 614, a secure bundle (including the first secure signaling channel and a group of channels of the plurality of channels and associated transmission frequencies) is generated. The secure bundle may be generated by the following process:
1. Randomly selecting the group of channels.
2. Randomly selecting a bit count associated with the secure bundle.
3. Randomly generating a secure key for securing each channel of the group of channels in accordance with the first light intensity.
4. Encrypting (by the secure key) the group of channels.

In step 618, data is transmitted via the secure bundle. In step 620, it is determined that the bit count (for the secure bundle) will expire within a specified time period. In step 622, a new group of channels is randomly selected. In step 624, an updated secure bundle comprising the first secure signaling channel and an updated group of channels and updated associated light intensities is generated. In step 626, an updated bit count associated with the updated secure bundle is randomly selected. In step 628, it is determined that the updated bit count has expired. In step 630, flow of the data being transmitted is transferred via the secure bundle to the updated secure bundle. In step 632, the data is transmitted via the updated secure bundle.

Figure 7:
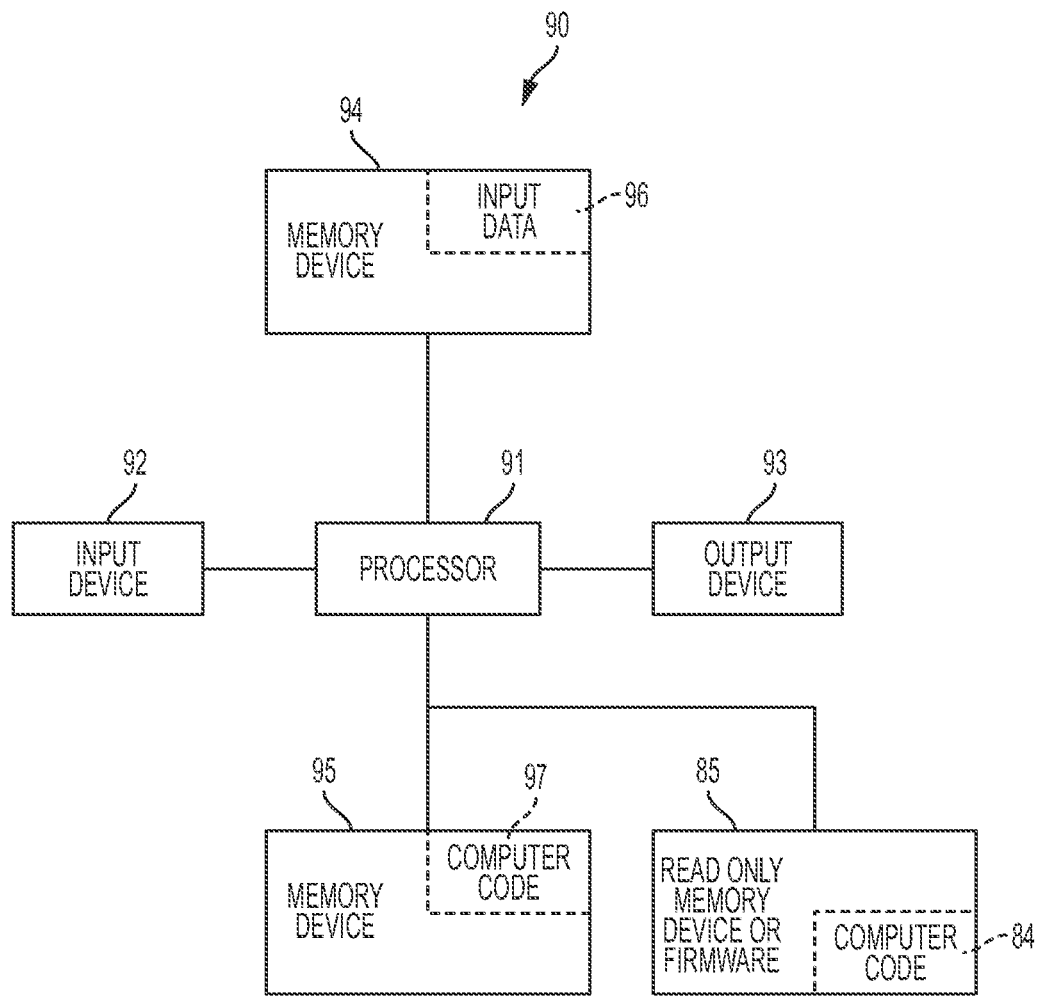
FIG. 7 illustrates a computer system 90 for transmitting multiple frequency light pulses for transporting secure transmissions via multiple light intensities over multimode fiber optic cables, in accordance with embodiments of the present invention.

FIG. 7 illustrates a computer system 90 (e.g., receiver apparatus 114 or transmitter apparatus 126 of FIG. 1) for transmitting multiple frequency light pulses for transporting secure transmissions via multiple light intensities over multimode fiber optic cables, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIGS. 2-6) for transmitting multiple frequency light pulses for transporting secure transmissions via multiple light intensities over multimode fiber optic cables. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include the algorithms of FIGS. 2-6 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2-6) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to for transmit multiple frequency light pulses for transporting secure transmissions via multiple light intensities over multimode fiber optic cables. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for transmitting multiple frequency light pulses for transporting secure transmissions via multiple light intensities over multimode fiber optic cables. In another embodiment, the invention provides a business method that performs the process steps of the invention on a subscription, advertising, and/or fee basis. That is, a service supplier, such as a Solution Integrator, could offer to transmit multiple frequency light pulses for transporting secure transmissions via multiple light intensities over multimode fiber optic cables. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A fiber optic light intensity encryption method comprising:
   determining, by a computer co-processor of a laser transmitter apparatus, a plurality of light intensities associated with a plurality of multi-frequency light pulses emitted by a laser transmitter apparatus, wherein said plurality of light intensities associated with said plurality of multi-frequency light pulses are associated with an encryptions process;
   calibrating, by said computer coprocessor, said laser transmitter apparatus by transmitting a sequence of binary frames starting from a highest number of active laser crystals down to one active laser crystal and registering a definition for each color frame of said sequence of binary frames;
   determining, by said computer co-processor in combination with said laser transmitter apparatus, an encryption type for applying to each light intensity of said plurality of light intensities;
   randomly selecting, by said computer co-processor, a first light intensity of said plurality of light intensities associated with a first light pulse of said plurality of multi-frequency light pulses;
   transmitting to said laser receiver apparatus, by said computer co-processor, an initial security key over a first signaling channel of a plurality of channels of said laser transmitter apparatus, wherein said first signaling channel is associated with said first light intensity of said first light pulse;
   generating, by said computer co-processor based on a first secure signaling channel secured based on said initial security key, a secure bundle comprising said first secure signaling channel and a group of channels of said plurality of channels and associated transmission frequencies; and
   transmitting, by said computer co-processor, data via said secure bundle.

2. The method of claim 1, wherein said generating, said secure bundle comprises:
   randomly selecting said group of channels;
   randomly selecting a bit count associated with said secure bundle;
   randomly generating a secure key for securing each of said group of channels in accordance with said first light intensity; and
   encrypting, by said secure key, said group of channels.

3. The method of claim 2, further comprising:
   determining, by said computer co-processor, that said bit count will expire within a specified time period;
   randomly, by said computer co-processor, selecting a new group of channels of said plurality of channels;
   generating, by said computer co-processor, an updated secure bundle comprising said first secure signaling channel and an updated group of channels of said plurality of channels and updated associated light intensities of said plurality of light intensities; and
   randomly selecting an updated bit count associated with said updated secure bundle.

4. The method of claim 3, further comprising:
   determining, by said computer co-processor, that said updated bit count has expired;
   transferring, by said computer co-processor, flow of said data being transmitted via said secure bundle to said updated secure bundle; and
   transmitting, by said computer co-processor, said data via said updated secure bundle.

5. The method of claim 1, further comprising:
   enabling, by said computer co-processor, pre-share keys for generating said initial security key associated with said securing.

6. The method of claim 1, further comprising:
   enabling, by said computer co-processor, certificates for generating said initial security key associated with said securing.

7. The method of claim 1, further comprising:
   generating, by said computer co-processor, self-signed certificates for generating said initial security key associated with said securing.

8. The method of claim 1, further comprising:
   providing at least one support service for at least one of creating, integrating, hosting, maintaining, and deploying computer-readable code in the computing system, said code being executed by the computer co-processor to implement: said determining said plurality of light intensities, said determining said encryption type, said randomly selecting, said transmitting said initial security key, said generating, and said transmitting data via said secure bundle.

9. A laser transmitter apparatus comprising a computer co-processor coupled to a computer-readable memory unit, said memory unit comprising instructions that when executed by the computer co-processor implements a fiber optic light intensity encryption method comprising:
   determining, by said computer co-processor, a plurality of light intensities associated with a plurality of multi-frequency light pulses emitted by a laser transmitter apparatus, wherein said plurality of light intensities associated with said plurality of multi-frequency light pulses are associated with an encryptions process;
   calibrating, by said computer coprocessor, said laser transmitter apparatus by transmitting a sequence of binary frames starting from a highest number of active laser crystals down to one active laser crystal and registering a definition for each color frame of said sequence of binary frames;

determining, by said computer co-processor in combination with said laser transmitter apparatus, an encryption type for applying to each light intensity of said plurality of light intensities;

randomly selecting, by said computer co-processor, a first light intensity of said plurality of light intensities associated with a first light pulse of said plurality of multi-frequency light pulses;

transmitting to said laser receiver apparatus, by said computer co-processor, an initial security key over a first signaling channel of a plurality of channels of said laser transmitter apparatus, wherein said first signaling channel is associated with said first light intensity of said first light pulse;

generating, by said computer co-processor based on a first secure signaling channel secured based on said initial security key, a secure bundle comprising said first secure signaling channel and a group of channels of said plurality of channels and associated transmission frequencies; and transmitting, by said computer co-processor, data via said secure bundle.

10. The laser transmitter apparatus of claim 9, wherein said generating, said secure bundle comprises:
randomly selecting said group of channels;
randomly selecting a bit count associated with said secure bundle;
randomly generating a secure key for securing each of said group of channels in accordance with said first light intensity; and
encrypting, by said secure key, said group of channels.

11. The laser transmitter apparatus of claim 10, wherein said method further comprises:
determining, by said computer co-processor, that said bit count will expire within a specified time period;
randomly, by said computer co-processor, selecting a new group of channels of said plurality of channels;
generating, by said computer co-processor, an updated secure bundle comprising said first secure signaling channel and an updated group of channels of said plurality of channels and updated associated light intensities of said plurality of light intensities; and
randomly selecting an updated bit count associated with said updated secure bundle.

12. The laser transmitter apparatus of claim 11, wherein said method further comprises:
determining, by said computer co-processor, that said updated bit count has expired;
transferring, by said computer co-processor, flow of said data being transmitted via said secure bundle to said updated secure bundle; and
transmitting, by said computer co-processor, said data via said updated secure bundle.

13. The laser transmitter apparatus of claim 9, wherein said method further comprises:
enabling, by said computer co-processor, pre-share keys for generating said initial security key associated with said securing.

14. The laser transmitter apparatus of claim 9, wherein said method further comprises:
enabling, by said computer co-processor, certificates for generating said initial security key associated with said securing.

15. The laser transmitter apparatus of claim 9, wherein said method further comprises:
generating, by said computer co-processor, self-signed certificates for generating said initial security key associated with said securing.

16. A computer program product, comprising a computer readable hardware storage device storing a computer readable program code, said computer readable program code comprising an algorithm that when executed by a computer co-processor of a laser transmitter apparatus implements a fiber optic light intensity encryption method, said method comprising:

determining, by said computer co-processor, a plurality of light intensities associated with a plurality of multi-frequency light pulses emitted by a laser transmitter apparatus, wherein said plurality of light intensities associated with said plurality of multi-frequency light pulses are associated with an encryptions process;

calibrating, by said computer coprocessor, said laser transmitter apparatus by transmitting a sequence of binary frames starting from a highest number of active laser crystals down to one active laser crystal and registering a definition for each color frame of said sequence of binary frames;

determining, by said computer co-processor in combination with said laser transmitter apparatus, an encryption type for applying to each light intensity of said plurality of light intensities;

randomly selecting, by said computer co-processor, a first light intensity of said plurality of light intensities associated with a first light pulse of said plurality of multi-frequency light pulses;

transmitting to said laser receiver apparatus, by said computer co-processor, an initial security key over a first signaling channel of a plurality of channels of said laser transmitter apparatus, wherein said first signaling channel is associated with said first light intensity of said first light pulse;

generating, by said computer co-processor based on a first secure signaling channel secured based on said initial security key, a secure bundle comprising said first secure signaling channel and a group of channels of said plurality of channels and associated transmission frequencies; and transmitting, by said computer co-processor, data via said secure bundle.

17. The computer program product of claim 16, wherein said generating, said secure bundle comprises:
randomly selecting said group of channels;
randomly selecting a bit count associated with said secure bundle;
randomly generating a secure key for securing each of said group of channels in accordance with said first light intensity; and
encrypting, by said secure key, said group of channels.

18. The computer program product of claim 17, wherein said method further comprises:
determining, by said computer co-processor, that said bit count will expire within a specified time period;
randomly, by said computer co-processor, selecting a new group of channels of said plurality of channels;
generating, by said computer co-processor, an updated secure bundle comprising said first secure signaling channel and an updated group of channels of said plurality of channels and updated associated light intensities of said plurality of light intensities; and randomly selecting an updated bit count associated with said updated secure bundle.

19. The computer program product of claim 18, wherein said method further comprises:
   determining, by said computer co-processor, that said updated bit count has expired;
   transferring, by said computer co-processor, flow of said data being transmitted via said secure bundle to said updated secure bundle; and
   transmitting, by said computer co-processor, said data via said updated secure bundle.

20. The computer program product of claim 16, wherein said method further comprises:
   enabling, by said computer co-processor, pre-share keys for generating said initial security key associated with said securing.

* * * * *